US010471468B2

(12) United States Patent
Bower et al.

(10) Patent No.: US 10,471,468 B2
(45) Date of Patent: Nov. 12, 2019

(54) OMNIPHOBIC SURFACE FOR USE IN USER INTERFACE DEVICE

(75) Inventors: Chris Bower, Ely (GB); Paul Beecher, Cambridge (GB)

(73) Assignee: Nokia Technologies Oy, Espoo (FI)

( * ) Notice: Subject to any disclaimer, the term of this patent is extended or adjusted under 35 U.S.C. 154(b) by 925 days.

(21) Appl. No.: 13/551,720

(22) Filed: Jul. 18, 2012

(65) Prior Publication Data
US 2014/0023852 A1    Jan. 23, 2014

(51) Int. Cl.
*B32B 3/26* (2006.01)
*B05D 5/08* (2006.01)
*G02B 1/00* (2006.01)
*C03C 15/00* (2006.01)
*C03C 17/32* (2006.01)

(52) U.S. Cl.
CPC .............. *B05D 5/083* (2013.01); *C03C 15/00* (2013.01); *C03C 17/328* (2013.01); *G02B 1/00* (2013.01); *C03C 2204/08* (2013.01); *Y10T 428/249995* (2015.04)

(58) Field of Classification Search
CPC ....................................................... B32B 3/26
See application file for complete search history.

(56) References Cited

U.S. PATENT DOCUMENTS

2011/0229667 A1* 9/2011 Jin et al. ...................... 428/34.1
2014/0011013 A1* 1/2014 Jin et al. ..................... 428/297.4
2014/0147627 A1* 5/2014 Aizenberg .............. A61L 15/24
                                                                            428/141

OTHER PUBLICATIONS

"Inherently Superoleophobic Nanocomposite Coatings by Spray Atomization," Steele et al., Nano Letters, 2009, vol. 9, No. 1, 501-505.*
Derwent Abstract of JP2008158911A.*
Wong et al., "Bioinspired Self-Repairing Slippery Surfaces With Pressure-Stable Omniphobicity", Sep. 22, 2011, vol. 477, (pp. 443-447).

* cited by examiner

*Primary Examiner* — Ian A Rummel
(74) *Attorney, Agent, or Firm* — Harrington & Smith

(57) ABSTRACT

An apparatus including a durable porous substrate; and a perfluorinated liquid located within pores of the durable porous substrate. The durable porous substrate and the perfluorinated liquid together are configured to provide an omniphobic surface.

10 Claims, 4 Drawing Sheets

OMNIPHOBIC SURFACE FOR USE IN USER INTERFACE DEVICE

TECHNICAL FIELD

The present application relates generally to omniphobic surfaces. More specifically the present application relates generally to an omniphobic surface for use in a user interface device such as a display.

BACKGROUND

Omniphobic surfaces that are resistant to oils and organic liquids tend to be fragile and have poor abrasion resistance due to their reliance on micro or nano-scale structures that trap air. One problem with touch interfaces devices and touch sensitive displays commonly used for communication devices involves the deposition of fingerprint residue and other oily or organic based liquids, which detract from the appearance of the device. Superhydrophobic substrates are extremely water repellant, and are composed of low surface energy materials that are typically patterned at both the micro and nano-scale. The patterned surface traps a thin layer of air, which results in a high contact angle for water in contact with the superhydrophobic substrate, approaching 180 degrees, since the water is only in contact with a very small area of the underlying superhydrophobic substrate.

However, organic liquids and oils have much lower surface tensions than water, and are able to spread and wet a much higher proportion of a substrate, which can drastically reduce the contact angle, by effectively destabilizing the trapped air film. Furthermore, superhydrophobic surfaces can be wetted in extremely humid environments, since water can condense into the fine-scale structure, again collapsing the trapped air-film.

SUMMARY

Various examples are set out in the claims.

According to a first aspect, there is provided an apparatus, comprising a durable porous substrate and a perfluorinated liquid located within at least some pores of the durable porous substrate. The durable porous substrate and the perfluorinated liquid are together configured to provide an omniphobic surface. The durable porous substrate may be configured to withstand at least 1000 cycles with a Taber Rotary abraser using a CS-10F alumina abraser wheel and 250 g loading, and/or may be configured to have a pencil hardness of at least 6H, measured by the pencil hardness test, ASTM D 3363.

The durable porous substrate may comprise one or more of: sapphire, glass, alumina, and diamond. These materials may be considered "durable" as they are hard materials. These materials are also transparent and anti-reflective, and may therefore be suitable for use as a display screen of an electronic device.

The perfluorinated liquid may be a fluoropolymer. The durable porous substrate may comprise sapphire and the fluoropolymer may comprise perfluoropolyether. The durable porous substrate may comprise glass and the fluoropolymer may comprise fluoroacrylate polymer. Such combinations combine a hard, transparent, micro- or nano-structured substrate (sapphire, glass) with a functionalized material (fluoropolymer, perfluoropolyether, fluoroacrylate) which acts to reduce the surface energy of the substrate. These perfluorinated liquids are non-volatile and non-toxic, which makes them suitable for use in, for example, an apparatus which is to be interacted with by a user.

The perfluorinated liquid may be configured to lower the surface energy of the porous substrate to provide an omniphobic surface of the apparatus.

The durable porous substrate may be a durable substrate which has undergone an etching process to porosify the durable substrate and provide the durable porous substrate. The etching process may comprise etching the durable substrate with hydrofluoric acid. The etching of the durable substrate may comprise anodisation of the durable substrate. The etching of the durable substrate may comprise laser processing or reactive ion-etching (RIE).

The durable porous substrate may comprise a porous layer between 10 nm and 500 μm in thickness.

The durable porous substrate may contain pores, the pores having a mean pore diameter between 10 nm and 250 μm.

A sub-100 nm roughness may be created on the (transparent) substrate surface, and the addition of the perfluorinated liquid may reduce the change in refractive index from air/solid to air/perfluorinated liquid. This in turn may reduce any unwanted light scattering from the surface, and improves the anti-reflection properties. Thus the porous substrate/perfluorinated liquid apparatus may be suitable for use as a display screen for an electronic device, the display screen having improved anti-reflection properties due to the refractive index change from air/display caused by the presence of the perfluorinated liquid.

The topological features of the porous substrate (that is, the pores) act as a reservoir for the perfluorinated liquid to create a durable omniphobic surface. The reservoir may be considered as being formed by the pores or any roughness of the substrate such that a quantity of (perfluorinated) liquid greater than that which may be held on a flat substrate may be held in the pores.

The porous structure of the substrate may allow self-healing of a damaged porous substrate/perfluorinated liquid apparatus by the liquid re-flowing to create a flat surface over a damaged region. The re-flow may occur from liquid trapped in the pores/rough surface of the substrate flowing to the damaged area. This ability of the perfluorinated liquid to reflow to damages areas of the substrate render the surface of the porous substrate/perfluorinated liquid apparatus resistant to minor scratches and abrasion since the non-volatile perfluorinated liquid can reflow to fill the damaged areas.

The durable porous substrate may comprise a plurality of nanoparticles. Each of the plurality of nanoparticles may have a mean largest dimension between 10 nm and 250 μm.

The apparatus may be a module for a display screen or may be a display screen of a portable electronic device.

The omniphobic surface may be configured to resist the wetting of polar and non-polar liquid at the omniphobic surface. The omniphobic surface may be configured to cause a liquid droplet to have a contact angle with the omniphobic surface of >90°. The omniphobic surface may be configured to have a surface energy of 16 mN/m-20 mN/m.

According to a second aspect, there is provided a method, the method comprising providing a durable porous substrate and locating a perfluorinated liquid within pores of the durable porous substrate. The durable porous substrate and the perfluorinated liquid are together configured to provide an omniphobic surface.

Advantages of the present claimed invention include that an omniphobic surface is created which is durable and robust enough to be used as a display screen on an electronic device, such as a portable electronic device (for example a mobile phone, smartphone or PDA). Further, the omniphobic surface is created which has anti-reflective properties which is also appealing for use as a display screen on an electronic device. A further advantage is that the omniphobic surface as claimed is relatively easy to manufacture using readily available materials and techniques.

A device having such an omniphobic surface of its display screen would provide the user with a device having a screen which is advantageously easy to clean, and which would advantageously resist becoming dirty from a user interacting with the display screen (for example, from a user touching a touch-sensitive display screen with oily fingers). The easy-clean properties and dirt-resistance properties of the display screen are due to the display screen surface being omniphobic, by virtue of the screen being comprised as per the claimed invention, thus having an omniphobic surface which resists wetting from water and oils such as those found naturally in the fingertips and thumbs.

BRIEF DESCRIPTION OF THE FIGURES

For a more complete understanding of example embodiments, reference is now made to the following descriptions taken in connection with the accompanying drawings in which:

FIG. 5b shows an optical micrograph of the apparatus of FIG. 5a;

FIG. 6b shows an optical micrograph of the untreated glass wafer of FIG. 6a; and FIG. 6c shows an optical micrograph of the fluorinated-liquid-treated glass wafer of FIG. 6a.

DETAILED DESCRIPTION OF THE EXAMPLE ASPECTS

Example embodiments and their potential advantages may be understood by referring to FIGS. 1 to 4

Figure 1:
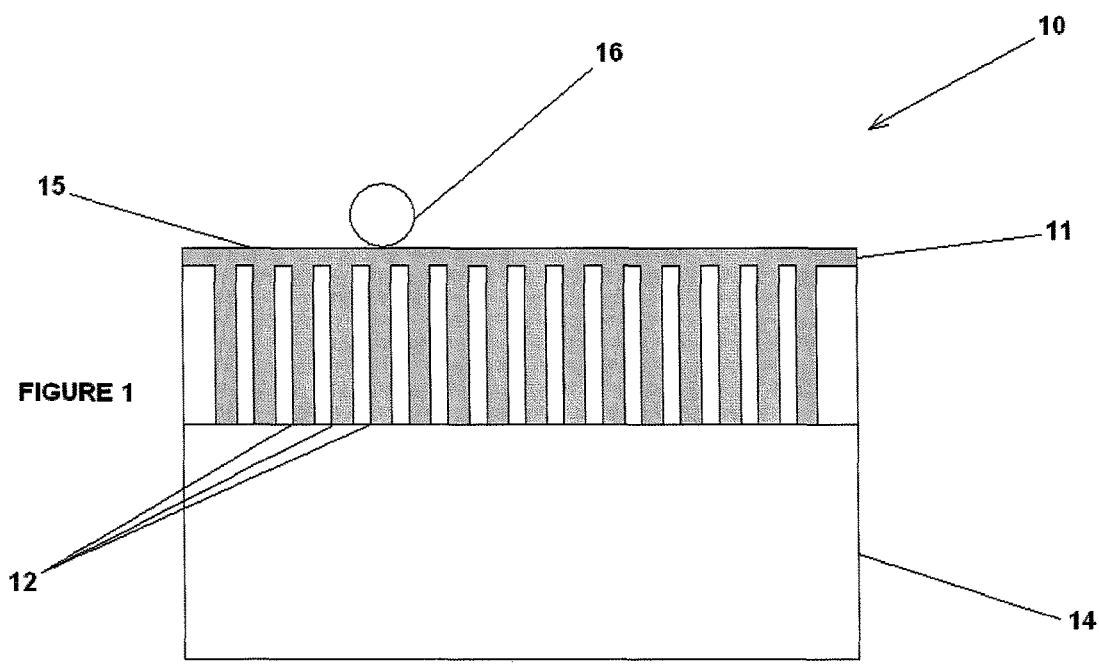
FIG. 1 shows an apparatus according to one embodiment.

An apparatus 10 is shown schematically in FIG. 1, comprising a perfluorinated liquid 11, and a durable porous substrate 14. The perfluorinated liquid 11 is at least partly located within pores 12 of the durable porous substrate 14. The durable porous substrate 14 and the perfluorinated liquid 11 together are configured to provide an omniphobic surface 15. The omniphobic surface 15 is configured to resist the wetting of polar and non-polar liquids at the surface, and is configured to cause a liquid droplet 16 to have a contact angle with the omniphobic surface 15 of >90°.

The perfluorinated liquid 11 has a lower surface energy, associated with the omniphobic surface 15, than perspiration and other liquid contaminants. A liquid contaminant may comprise one or more of: sweat, sebum, protein, fat, oil, food product, and detergent. The low surface energy of the omniphobic surface results in a high contact angle (>90°) for such liquid contaminants. A liquid contaminant droplet 16, in contact with the omniphobic surface 15 is consequently unlikely to wet the surface, and is likely to roll away from the omniphobic surface 15, as a result of the low surface energy of the perfluorinated liquid 11/omniphobic surface.

Figure 2:
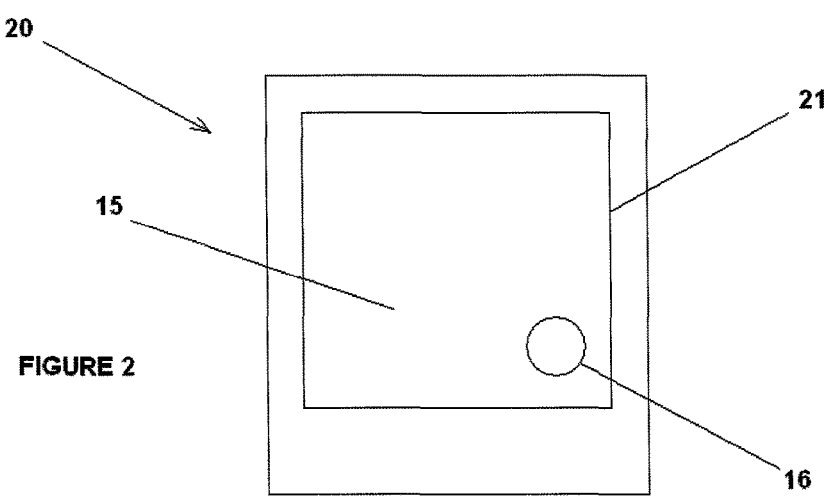
FIG. 2 shows a user interface device, according to another embodiment, comprising the apparatus shown in FIG. 1.

The apparatus 10 may form part of an electronic device 20 shown schematically in FIG. 2. The electronic device 20 may comprise a user interface device 21, which may be used, for example, as a user interface display or screen of the electronic device, or a module for such as display/screen. The user interface device 21 may be a touch sensitive display/screen of the electronic device 20 (or a module for the same). The user interface device 21 has the omniphobic surface 15 formed by the porous substrate 14 (not shown in FIG. 2) and perfluorinated liquid 11 (not shown in FIG. 2). A liquid contaminant droplet 16 may be deposited on the omniphobic surface 15 of the user interface device 21 as shown in FIG. 2. The omniphobic surface 15 may facilitate the removal of the liquid contaminant droplet 16 from the user interface device 21 because the surface energy of the omniphobic surface 15 is lower than that of the liquid contaminant droplet 16, causing the droplet to have a high contact angle with the omniphobic surface (the angle may be greater than 90°) and consequently the liquid droplet 16 will not wet the omniphobic surface 15, but will roll off it. The omniphobic surface 15 of the user interface device 21 may facilitate cleaning of the liquid contaminant droplet 16 away from the user interface device 21 in a similar way. Liquid contaminant droplet 16 removal may be facilitated by the liquid droplet 16 being unable to wet the omniphobic surface. The same liquid contaminant 16 may be able to wet a non-omniphobic surface (such as a non-coated glass surface, for example) and cause the non-omniphobic surface to appear dirty.

However, the omniphobic surface 15 may be damaged by interaction of a user with the user interface device 21 or by interaction of the user interface device 21 with its surroundings (for example, the user interface device 21 may be accidentally scratched or tapped against a hard object. One example is that the apparatus having the omniphobic surface may be used as a display for a portable electronic device, and a user may put the device in his pocket next to a hard object such as keys, which then scratch the display). Such damage may cause the user interface device 21 to be less easy to clean.

Figure 3:
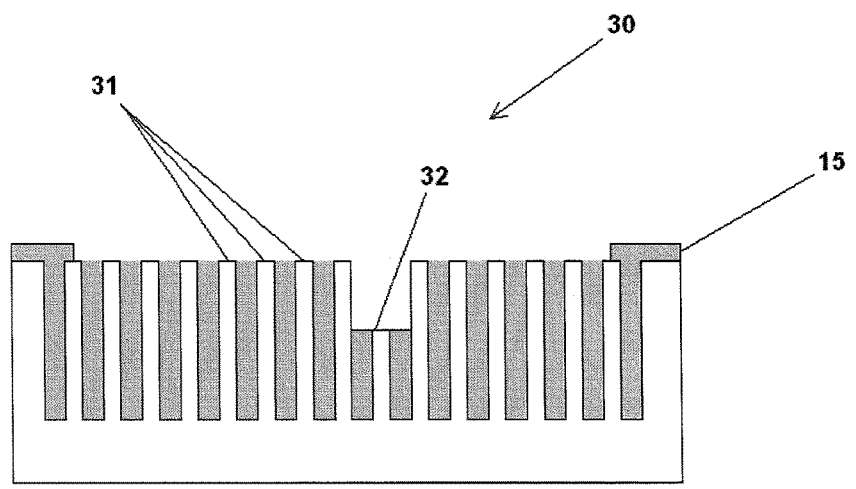
FIG. 3 shows an embodiment of the apparatus that has been damaged.

Damage 30 is shown schematically in FIG. 3, and may cause more of the porous substrate 31 to be in contact with a liquid contaminant droplet (not shown in FIG. 3) than would otherwise be the case if there was no damage 30 present. The porous substrate 31 may have a higher surface energy than the perfluorinated liquid 15 in the damaged region. A higher surface energy of the substrate 31, caused by the damage 30, may make it more difficult to clean the surface, which is undesirable if the porous substrate/perfluorinated liquid system is used as a display screen. In FIG. 3, the damage 30 has caused at least part of the porous substrate 32 to be deformed (in this case, broken), thereby reducing the pore volume in the damaged region 32 and reducing the amount of perfluorinated liquid that may be stored in the pores in this region 32.

Figure 4:
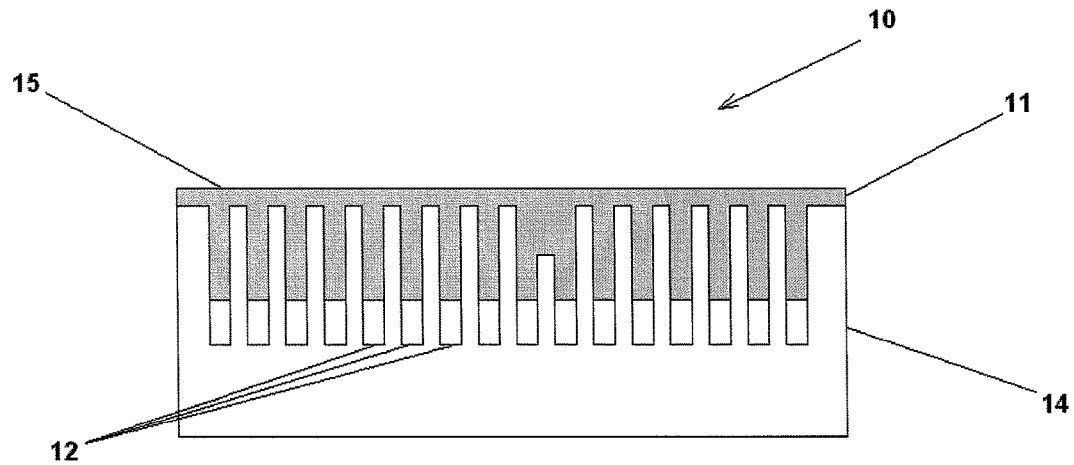
FIG. 4 shows an embodiment of the apparatus that has been damaged and then repaired.

FIG. 4 shows an apparatus 10, which has been damaged, similarly to the damaged apparatus of FIG. 3. The perfluorinated liquid 11 has reflowed from part of the pores 12, to reform the omniphobic surface 15. This omniphobic surface, now repaired with no surface damage has a sufficiently low surface energy to facilitate cleaning of the surface.

It will be understood that a choice of a substrate material in which the pores 12 are formed, and design of a process by which the pores 12 are formed in the substrate, is a complex calculation. Several factors must be taken into account. The surface energy of the substrate with pores 12, and the perfluorinated liquid 11, must together form an omniphobic surface 15. If the apparatus 10 is to form part of a user interface device 21 such as a touchscreen or display, then the optical properties of the apparatus 10 must be taken into accounted for and a transparent anti-reflective display screen is desirable. The structure of the pores 12 must also allow reflow of the perfluorinated liquid 11 to facilitate repair of the omniphobic surface 15 after damage has occurred.

The porous substrate and the perfluorinated liquid, together, may be configured to form an omniphobic surface that has an optical transmission of between 90% and 100%. The porous substrate and the perfluorinated liquid, together, may be configured to form an omniphobic surface that has a reduced Fresnel reflectivity, relative to the porous substrate alone, without the perfluorinated liquid. Such a high optical transmission and reduced Fresnel reflectivity makes the omniphobic surface suitable for use as a transparent, anti-reflective display screen for an electronic device, for example. The porous substrate may have an elastic modulus between 10 GPa and 200 GPa. The porous substrate may have an elastic modulus between 0.01 GPa and 5 GPa. The porous substrate may comprise a substantially non-porous region (for example, a region where there is no perfluorinated liquid and therefore is not omniphobic on contrast to the porous region with perfluorinated liquid forming the omniphobic region).

The porous region may have a porosity between 1% and 99% by volume. The porous region may have a porosity between 10% and 90%. The porous region may comprise a porous layer, and the porous layer may have a depth, measured from the omniphobic surface, between 10 nm and 1 mm. The porous layer may have a depth between 10 nm and 100 μm. The durable porous substrate may comprise pores, and the pores may have a mean pore diameter between 10 nm and 250 μm. The durable porous substrate may comprise a plurality of nanoparticles, and each of the plurality of the nanoparticles may have a mean largest dimension between 5 nm and 250 μm.

The durable porous substrate may be functionalized to lower its surface energy. The functionalized porous substrate may have a surface energy between 10 mNJ/m and 20 mNJ/m. The porous substrate may be configured such that its surface energy is less than the surface tension of the contaminant liquid, and above that of the surface tension of the perfluorinated liquid. The perfluorinated liquid may be configured such that its surface tension is between 5 mNm$^{-1}$ and 25 mNm$^{-1}$.

In one example, the durable porous substrate comprises sapphire as an unpolished sapphire wafer. The native crystalline sapphire (alumina) surface is relatively hydrophilic, so whilst a fluorosolvent such as a perfluorinated liquid may be spread on the sapphire surface, it will easily be displaced by another liquid having a lower liquid-solid surface tension. In order to maintain a stable lubricating layer of fluorosolvent on the sapphire surface, the surface energy of the sapphire was lowered. This was achieved by the unpolished sapphire wafer being functionalized by grafting a perfluoropolyether (PFPE) material to its surface. First the unpolished sapphire surface was activated using an atmospheric plasma treatment, using a Diener Femto at 100% power for two minutes. The activated sample was then submerged in a 0.1% w/w solution of PFPE in FC43, for three minutes, before being left to dry overnight on a hotplate at 50° C. After this treatment, the sample was relatively hydrophobic with a water contact angle of around 110°, and water droplets were seen to easily slide off the surface of the tilted sample.

To provide a comparison between treatments, one half of the resulting functionalized sapphire wafer was then treated with Krytox 107 PFPE, a non-volatile fluorinated oil having an evaporation of less than 1% weight after 22 hours at 121° C. In order not to have an excess of PFPE (which is relatively viscous), the excess was wiped away using a cleanroom wipe. The sample was then spin coated at 3000 rpm for 30 s.

The two halves of the wafer (treated and untreated with PFPE) were tested with water and ethanol. Neither water nor ethanol wetted the wafer, both on the treated and untreated sides. Droplets of both liquids were seen to slide off. The ethanol was more mobile on the PFPE treated side of the sample.

Figure 5A:
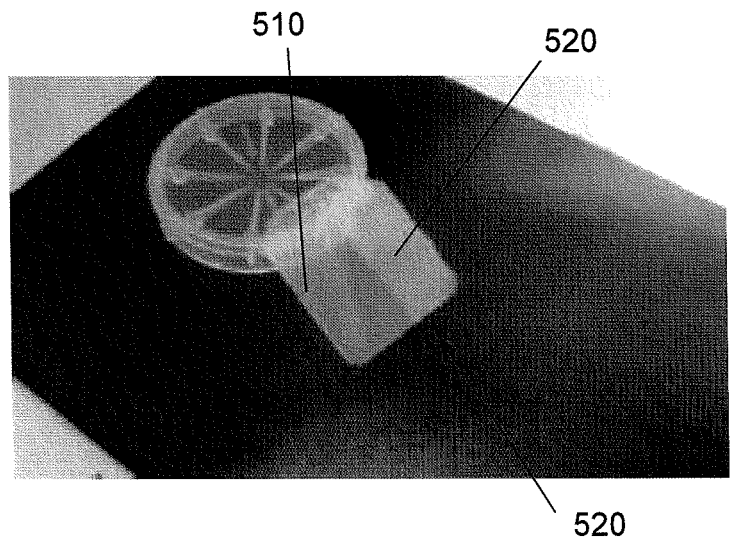
FIG. 5a shows an embodiment of the apparatus which is an unpolished sapphire wafer, half of which has been treated with a perfluorinated liquid.
Figure 5B:
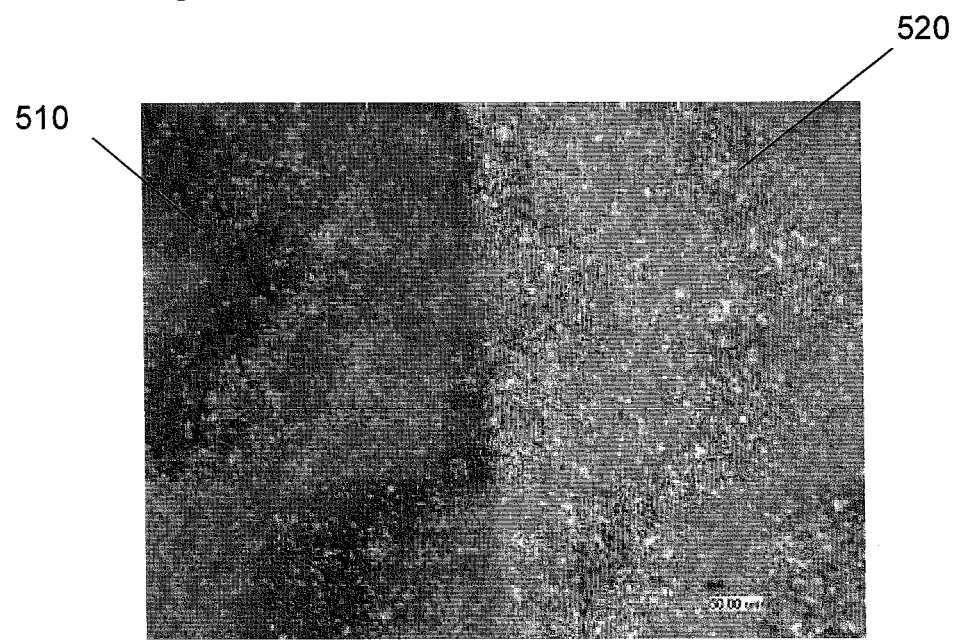

FIG. 5a shows the unpolished sapphire wafer 500, the left hand half of which 510 has been treated with a perfluorinated liquid (PFPE), and the right hand half of which 520 has not been treated with a perfluorinated liquid (PFPE). FIG. 5b shows an optical micrograph of the apparatus of FIG. 5a. The reduction in light scattering of the PFPE treated side 510 can be seen compared with the untreated side 520. Such reduction in light scattering, as well as the high transparency, may allow such materials to be used as displays for electronic devices.

In another example, two samples of a durable porous glass substrate were used. The porous glass substrates were Pyrex substrates, and in this example comprised a multiplicity of tapered glass pillars, each having a mean height of 10 micrometers, and a mean diameter of 10 micrometer, with a mean centre-to-centre spacing of 20 micrometers. The mean diameter of the tapered glass pillars in other examples may be between 10 nm and 100 nm. The porous glass substrates in this example were fabricated by reactive ion etching (RIE).

Figure 6A:
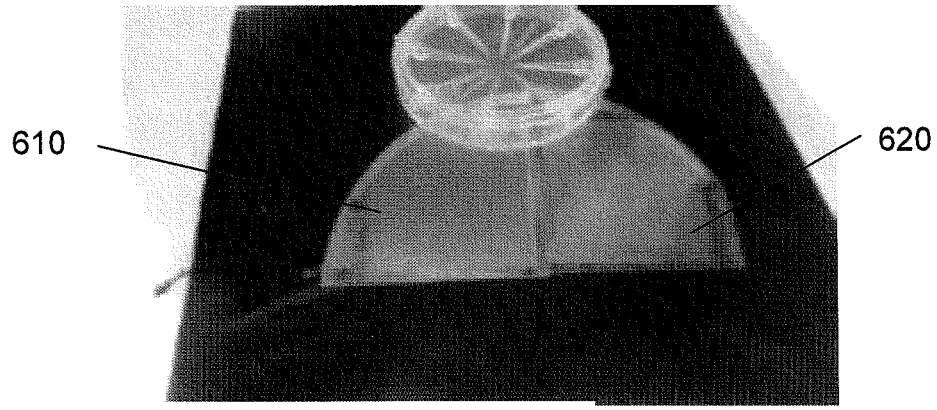
FIG. 6a shows an embodiment of the apparatus which is a glass wafer with pillars treated with a perfluorinated liquid, and a second glass wafer with pillars which is untreated.
Figure 6B:
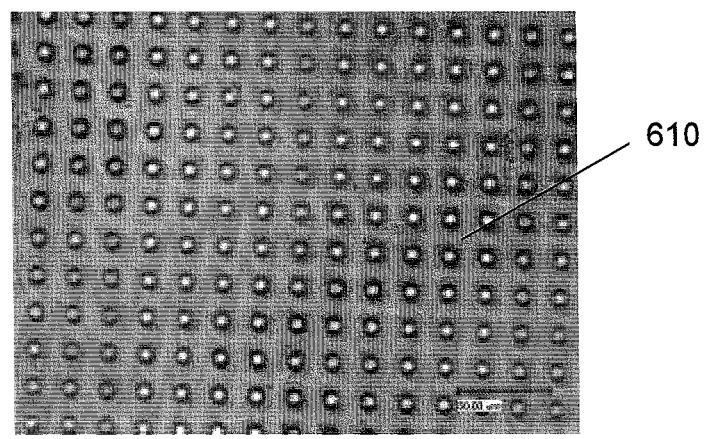
Figure 6C:
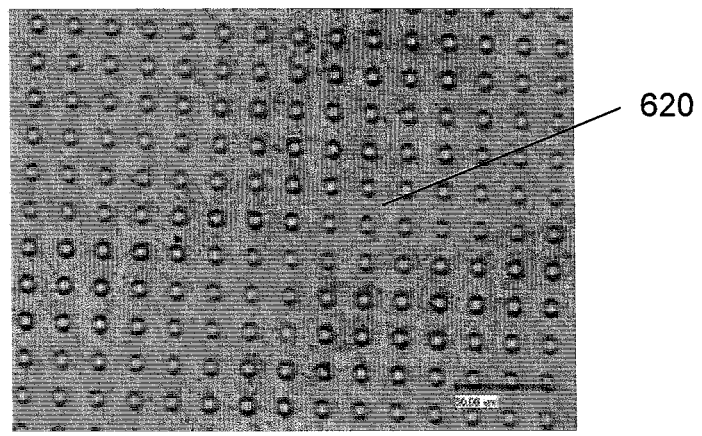

FIG. 6a shows the two glass wafer substrates with pillars. The wafer on the left 610 has been treated with a perfluorinated liquid (PFPE), and the second glass wafer on the right 620 has not been treated with a perfluorinated liquid. FIG. 6b shows an optical micrograph of the treated glass wafer 610 of FIG. 6a. FIG. 6c shows an optical micrograph of the fluorinated-liquid-treated glass wafer 620 of FIG. 6a. The PFPE fluorinated oil fills the small gaps and spaces in the micro-rough regions between the glass pillars as can be seen in FIGS. 6b and 6c, where the substrate between the pillars in FIG. 6b is much smoother than that of FIG. 6c.

The resulting porous glass substrates were functionalized by coating each with a 10 nm-100 nm thick transparent layer of fluoroacrylate polymer.

One of the samples was treated with the non-volatile fluorinated oil Krytox 107 PFPE (herein referred to as PFPE), and excess PFPE was wiped away from the sample surface with a cleanroom wipe before spinning at 3000 rpm. In other examples, a porous substrate may be fabricated by etching an initially unporosified substrate with hydrofluoric acid.

A comparison between the treated and untreated samples was performed. As in the previous example, the sample which was not treated with PFPE remained superhydrophobic and water droplets were seen to bounce off the surface. This untreated sample was completed wetted by ethanol on the surface. In comparison, the sample treated with PFPE (perfluorinated liquid) is similarly resistant to the presence of both water and ethanol on the surface, with droplets of water and of ethanol rolling off the PFPE treated surface.

Further, fingerprints made on the PFPE treated sample surface, whilst initially visible on the surface, were seen to disappear over a period of time as the perfluorinated liquid (PFPE) reflowed over the substrate surface and the oil deposited by the fingerprint being made was removed from the omniphobic surface.

In other examples, a porous sapphire substrate may be fabricated by etching an initially unporosified sapphire substrate with hydrofluoric acid. A porous glass substrate may be fabricated by etching an initially unporosified glass substrate with hydrofluoric acid. A porous substrate may comprise porous aluminium oxide. A porous aluminium oxide substrate may be fabricated by anodizing an initially unporosified aluminium oxide wafer in an electrolyte, and the aluminium oxide may then be subsequently converted into crystalline alumina (sapphire) by heating in a furnace to cause crystallization.

In other examples, a porous substrate may comprise a porous elastomer. A porous elastomeric substrate may be fabricated by micro or nano-phase separation of a di-block or tri-block copolymer or a blend of block copolymers and homopolymers to be fabricated by casting an elastomeric resin on a textured surface to create a replica in the elastomer. The elastomer may be selected from one or more of: poly(4-fluorostyrene-r-styrene)-b-poly(d,l-lactide) (PFS-PLA) polystyrene-poly(ethylene oxide) (PS-PEO), and polystyrene-polylactide (PS-PLA) block copolymer. Commercially available surfactants such as Pluronics e.g. poly (ethylene oxide)-b-poly(propylene oxide)-b-alkyl surfactant with the nominal formula EO17-PO12-C14, may also be used to create nano-structured silica templates.

The perfluorinated liquid may comprise PFPE having the general formula $F—(CF—CF_3—CF_2—O)_n—CF_2CF_3$ were n=10-60. The perfluorinated liquid may comprise: PFPE having the general formula $F—(CF—CF_3—CF_2—O)_n—CF_2CF_3$ where n=10-60, and submicron polytetrafluoroethylene (PTFE) particles.

Without in any way limiting the scope, interpretation, or application of the claims appearing below, a technical effect of one or more of the examples disclosed herein is to provide a self cleaning surface for a touchscreen that forms part of a user interface device. Another technical effect of one or more of the examples disclosed herein is to improve the optical properties of self cleaning surfaces. Another technical effect of one or more of the examples disclosed herein is to improve durability of self cleaning surfaces.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. An apparatus, comprising:
    a durable porous substrate having an elastic modulus of between 10 GPa and 200 GPa and comprising a multiplicity of tapered pillars formed with a surface of the durable porous substrate, wherein the durable porous substrate comprises a plurality of nanoparticles, each of the plurality of nanoparticles having a mean largest dimension between 10 nm and 250 µm; and
    a perfluorinated liquid located within pores of the durable porous substrate, wherein the perfluorinated liquid is a fluoropolymer, the durable porous substrate and the perfluorinated liquid together configured to provide an omniphobic surface having an optical transmission of between 90% and 100%;
    wherein the durable porous substrate and the perfluorinated liquid define a display screen;
    wherein the display screen is self-repairing;
    wherein the perfluorinated liquid is reflowable within the pores of the porous substrate to lower the surface energy of the porous substrate such that the omniphobic surface causes a liquid droplet to have a contact angle of greater than 90 degrees with the omniphobic surface;
    wherein the durable porous substrate and the perfluorinated liquid form the omniphobic surface having a Fresnel reflectivity that is less than a Fresnel reflectivity of the durable porous substrate alone to provide a substantially transparent and anti-reflective surface; and
    wherein the durable porous substrate comprises glass, and the fluoropolymer comprises fluoroacrylate polymer.

2. An apparatus according to claim 1, wherein the durable porous substrate further comprises one or more of: glass, alumina, and diamond.

3. An apparatus according to claim 1 wherein the durable porous substrate is a durable substrate which has undergone an etching process to porosity the durable substrate and provide the durable porous substrate.

4. An apparatus according to claim 3 wherein the etching process comprises etching the durable substrate with hydrofluoric acid.

5. An apparatus according to claim 1 wherein the durable porous substrate comprises a porous layer between 10 nm and 500 µm in thickness.

6. An apparatus according to claim 1 wherein the durable porous substrate contains pores, the pores having a mean pore diameter between 10 nm and 250 µm.

7. An apparatus according to claim 1 wherein the apparatus is a module for the display screen or the display screen forms a part of a portable electronic device.

8. An apparatus according to claim 1 wherein the omniphobic surface is configured to resist the wetting of polar and non-polar liquid at the omniphobic surface.

9. An apparatus according to claim 1 wherein the omniphobic surface is configured to have a surface energy of 16 mN/m-20 mN/m.

10. A method, comprising:
    providing a durable porous substrate having an elastic modulus of between 10 GPa and 200 GPa and comprising a multiplicity of tapered pillars formed with a surface of the durable porous substrate, wherein the durable porous substrate comprises a plurality of nanoparticles, each of the plurality of nanoparticles having a mean largest dimension between 10 nm and 250 µm; and
    locating a perfluorinated liquid within pores of the durable porous substrate, wherein the perfluorinated liquid is a fluoropolymer, the durable porous substrate and the perfluorinated liquid together configured to provide an omniphobic surface having an optical transmission of between 90% and 100%;

lowering the surface energy of the porous substrate based on reflow of the perfluorinated liquid within the pores of the durable porous substrate such that the omniphobic surface causes a liquid droplet to have a contact angle of greater than 90 degrees with the omniphobic surface;

wherein the durable porous substrate and the perfluorinated liquid define a display screen;

wherein the display screen is self-repairing;

wherein the durable porous substrate and the perfluorinated liquid form the omniphobic surface having a Fresnel reflectivity that is less than a Fresnel reflectivity of the durable porous substrate alone to provide a substantially transparent and anti-reflective surface; and wherein the durable porous substrate comprises glass, and the fluoropolymer comprises fluoroacrylate polymer.

* * * * *

UNITED STATES PATENT AND TRADEMARK OFFICE
CERTIFICATE OF CORRECTION

PATENT NO. : 10,471,468 B2
APPLICATION NO. : 13/551720
DATED : November 12, 2019
INVENTOR(S) : Chris Bower and Paul Beecher It is certified that error appears in the above-identified patent and that said Letters Patent is hereby corrected as shown below:

In the Claims

In Claim 3:
Column 8, Line 32, "porosity" should be deleted and -- porosify -- should be inserted.

Signed and Sealed this
Fourteenth Day of January, 2020

Andrei Iancu
*Director of the United States Patent and Trademark Office*